United States Patent [19]

Lee

[11] Patent Number: 5,369,798
[45] Date of Patent: Nov. 29, 1994

[54] METHOD AND CIRCUIT FOR SAVING THE POWER OF A BATTERY USED IN A PORTABLE RADIO TELEPHONE

[75] Inventor: Young-Sub Lee, Euiwang, Rep. of Korea

[73] Assignee: SamSung Electronics Co., Ltd., Suwon, Rep. of Korea

[21] Appl. No.: 989,823

[22] Filed: Dec. 14, 1992

[30] Foreign Application Priority Data

Nov. 13, 1992 [KR] Rep. of Korea ............... 1992-21300

[51] Int. Cl.$^5$ ............................................. H04B 1/16
[52] U.S. Cl. ................................ 455/33.1; 455/343; 455/176.1; 379/58
[58] Field of Search ............... 455/343, 38.3, 127, 455/176.1, 168.1, 33.1; 379/63, 58; 340/825.44; 370/100.1, 104.1

[56] References Cited

U.S. PATENT DOCUMENTS

| | | | |
|---|---|---|---|
| 4,370,753 | 1/1983 | Ehmke | 455/343 |
| 4,479,261 | 10/1984 | Oda et al. | 455/343 |
| 4,839,639 | 6/1989 | Sato et al. | 340/825.44 |
| 4,903,319 | 2/1990 | Kasai et al. | 379/63 |
| 4,961,073 | 10/1990 | Drapac et al. | 340/825.44 |
| 5,101,500 | 3/1992 | Marui | 379/63 |
| 5,144,296 | 9/1992 | DeLuca et al. | 340/825.44 |
| 5,301,225 | 4/1994 | Suzuki et al. | 455/343 |

FOREIGN PATENT DOCUMENTS

0154539  6/1990  Japan .................... 455/38.3

Primary Examiner—Reinhard J. Eisenzopf
Assistant Examiner—Doris H. To
Attorney, Agent, or Firm—Robert E. Bushnell

[57] ABSTRACT

The portable radio telephone performs the channel scanning for one of the two channel systems "A" and "B" divided from a cellular service band to select two channels with largest RSSIs. The main processor determines which one of the two channels receives the data, so as to tune the telephone to the channel that receives the data, and stands by. The main processor stops the operation during detecting word synchronization signal, thus saving the battery power.

20 Claims, 5 Drawing Sheets (PRIOR ART)
FIG. 1

METHOD AND CIRCUIT FOR SAVING THE POWER OF A BATTERY USED IN A PORTABLE RADIO TELEPHONE

TECHNICAL BACKGROUND

The present invention relates to a method and circuit for saving the power of a battery used in a portable cellular radio telephone.

Generally the portable cellular radio telephone includes elements using a low operating current to save the power of a battery. Moreover, it is so made as to intermittently receive the power supply of the battery only required for a signal reception during the idle state. Such technique is widely used in mobile radio telecommunication units like a paging system, which technique is disclosed in Korean Patent Application No. 89-1749 of the present applicant and U. S. Pat. No. 4,479,261 of Oda.

Figure 1:
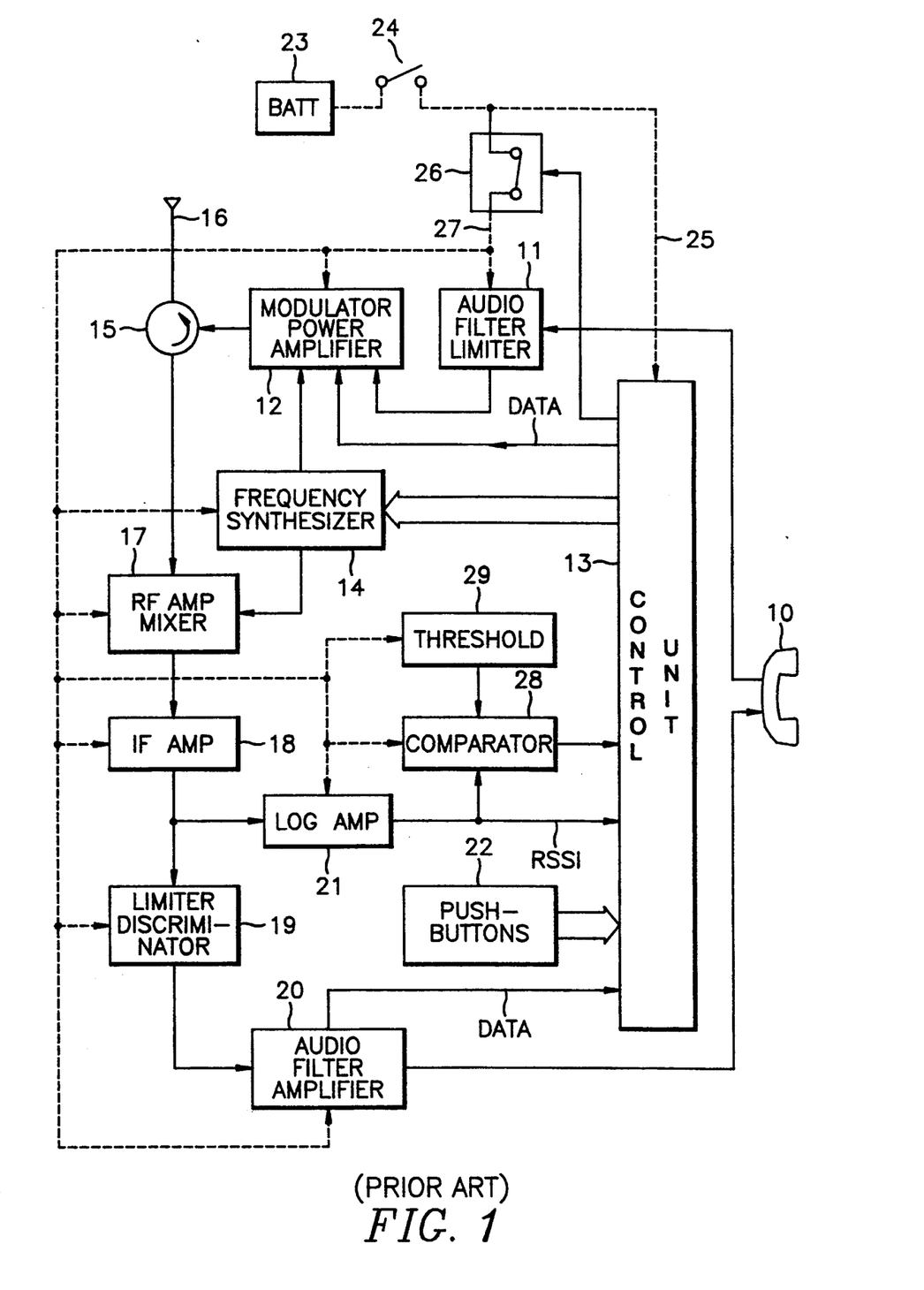
FIG. 1 is a block diagram for illustrating a conventional portable radio telephone circuit.

Another kind of such technique is disclosed in U.S. Pat. No. 4,903,319 entitled as "Portable Radio Telephone Having Power Saver". In this case, a portable radio telephone is made so that other elements except a processor are cut off from the battery power in the outside of the network service area. Referring to FIG. 1, a comparator 28 compares a received signal strength indicator signal RSSI with a threshold voltage supplied from a voltage source 29. This threshold voltage represents the signal level at the boundary of the service area. When the portable radio telephone is outside of the service area, the RSSI signal is lower than the threshold and the comparator 28 generates a low voltage output applied to the processor 13 to cut off the battery power from supplying.

However, the processor 13 is continuously supplied with the battery power. Moreover the RSSI signal changes too abruptly due to fading to be used for judging whether the portable radio telephone is within the network service area, and it is very difficult to determine the threshold voltage.

SUMMARY OF THE INVENTION

It is an object of the present invention to provide a method and circuit for saving the power of a battery used in a portable radio telephone, wherein the main processor is intermittently operated during channel scanning for detecting word synchronization data.

According to an aspect of the present invention, a portable radio telephone for saving the power of a battery selects a first channel and a second channel by channel tuning. The portable radio telephone is tuned to the first channel and set up a first interrupt time interval (C timer setting) during which the main processor is stopped and the word synchronization data is detected, and causes the main processor to resume the normal operation to receive overhead message when detecting the word synchronization data and then to be in standby. The portable radio telephone is tuned to the second channel when the word synchronization data is not detected in the first channel, and performs the first interrupt time interval setting and word synchronization detection steps to detect the word synchronization data in the second channel. The portable radio telephone counts the number of the fails to detect the word synchronization data in the second channel, and checks whether the power-off mode is set for the outside of the service area of the network. The second interrupt time interval (V timer) set up to stop the main processor and to again perform the above processing steps when the power-off mode is not set or the number of the fails exceeds a given value, and the portable radio telephone is switched off when the number of the fails equals the given value.

In one aspect of the present invention, the portable radio telephone performs the channel scanning for one of the two channel systems "A" and "B" divided from a cellular service band to select two channels with largest RSSIs. The main processor determines which one of the two channels receives the data, so as to tune the telephone to the channel that receives the data, and stands by. The main processor stops the operation during detecting word synchronization signal, thus saving the battery power.

BRIEF DESCRIPTION OF THE ATTACHED DRAWINGS

For a better understanding of the invention and to show how the same may be carried into effect, reference will now be made, by way of example, to the accompanying diagrammatic drawings, in which.

DETAILED DESCRIPTION OF A CERTAIN PREFERRED EMBODIMENT

Figure 2:
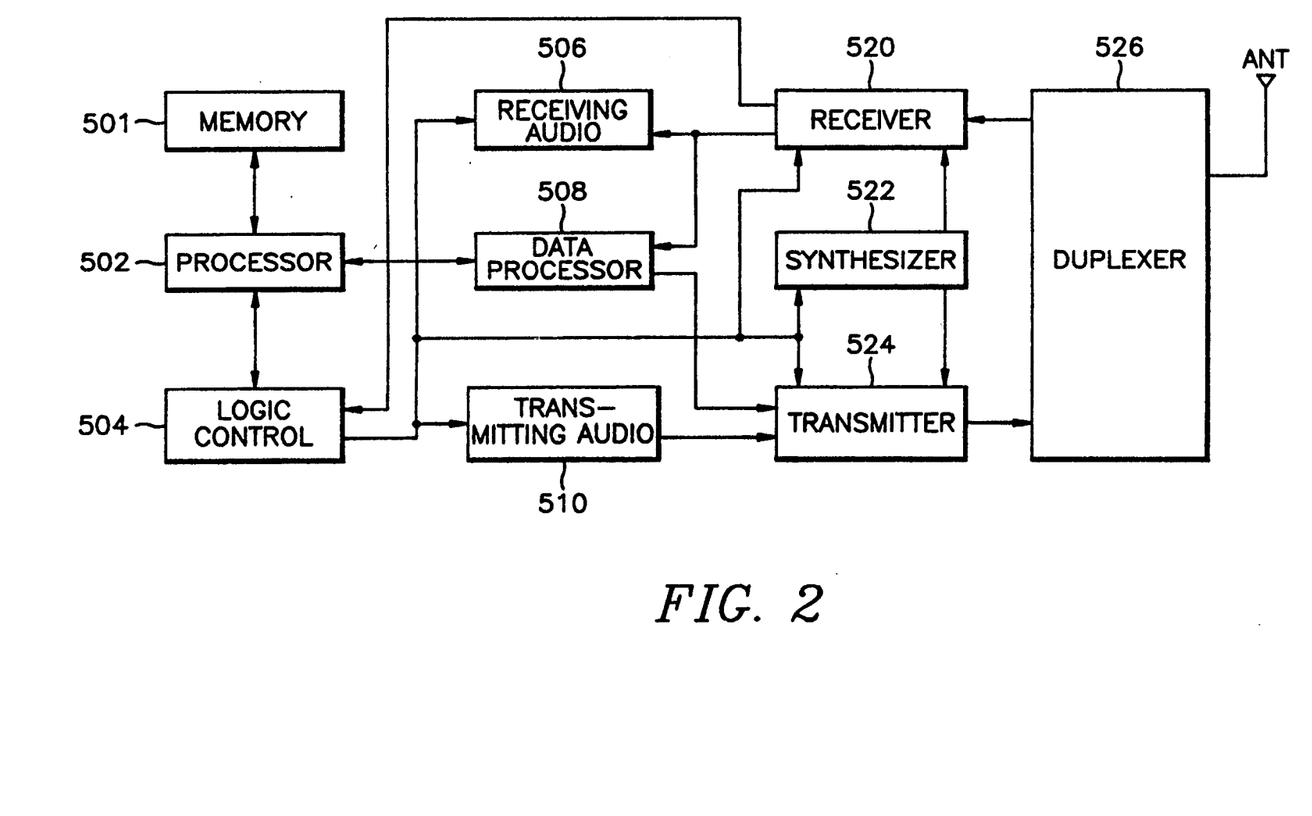
FIG. 2 is a block diagram for illustrating a portable radio telephone circuit with a battery saver according to the present invention.

Referring to FIG. 2, a portable radio telephone circuit with a battery saver includes a duplexer 526 for connecting a transmitter 524 and receiver 520 with an antenna ANT, a data processor 508 for processing the output of a main processor 502 applied to the transmitter 524 and the output of the receiver 520 applied to the main processor 502 an audio receiving audio circuit 506 connected to the output of the receiver 520 and the output of a logic control circuit 504 a transmitting audio circuit 510 for connecting the output of the logic control circuit 504 with the transmitter 524, memory 501 is connected to logic control 504 via main and frequency synthesizer 522 is connected to the output of logic control circuit 504. The main processor 502 processes the data from the data processor 508 according to the program and data received from the memory 501, thus causing the logic control circuit 504 to control the parts of the portable radio telephone circuit. The logic control circuit 504 performs tuning control and serves an important role to set up an interrupt time interval of the main processor 502.

When the data processor 508 detects word synchronization data, the main processor 502 sets up first interrupt time interval (C timer set value 92.6 ms) for a channel into the logic control circuit 504 and then stops the operation in order to reduce power consumption. After the first time interval, the logic control circuit 504 interrupts the main processor 502 to resume the operation to check whether the data processor 508 has detected the word synchronization data in the interrupt time interval.

If two channels do not show the word synchronization data, the main processor 502 counts the number of fails, sets up into the logic control circuit 504 a second interrupt time interval (V timing value) obtained by multiplying the number of fails by 92.6 ms, and then stops the operation. Of course, the second interrupt time interval varies with the number of fails. After the second interrupt time interval, the logic control circuit 504 interrupts the main processor 502 to resume the operation. Thus the main processor 502 stops the operation in the first and second interrupt time intervals in order to reduce the power consumption.

Figure 3A:
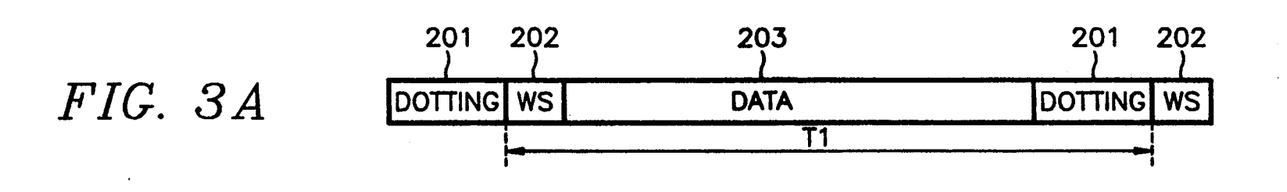
FIGS. 3A to 3G are timing diagrams for illustrating the operation of the circuit of FIG. 2.

FIG. 3A is an AMPS Advanced mobile phone Service data format used in the circuit of FIG. 2, wherein reference numeral 201 indicates a synchronization signal, 202 is a word synchronization data for preparing the data reception, and 203 is a data stream.

Figure 3B:
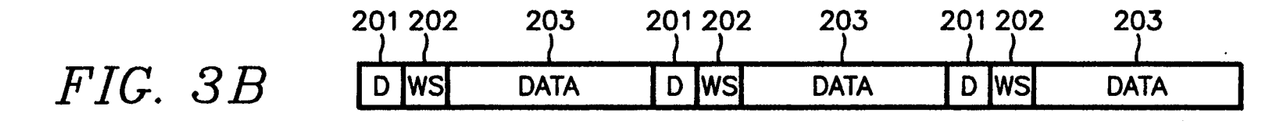
Figure 3C:
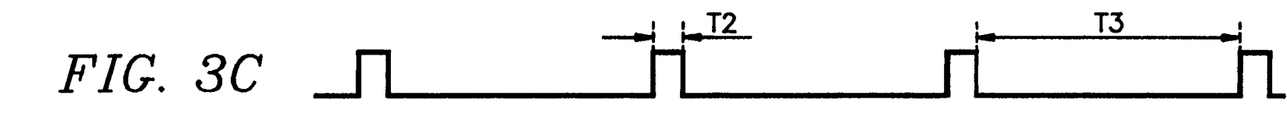
Figure 3D:
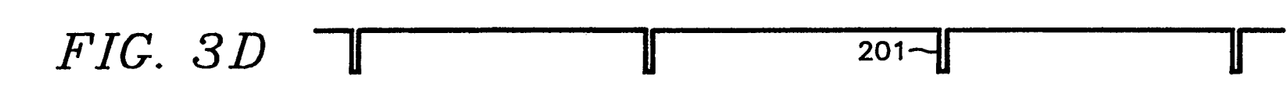
Figure 3E:
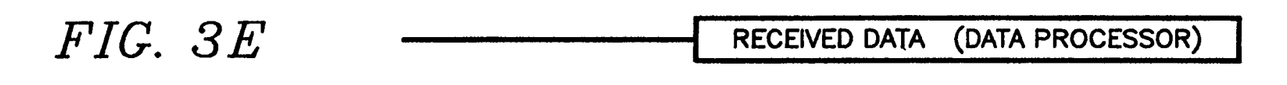
Figure 3F:
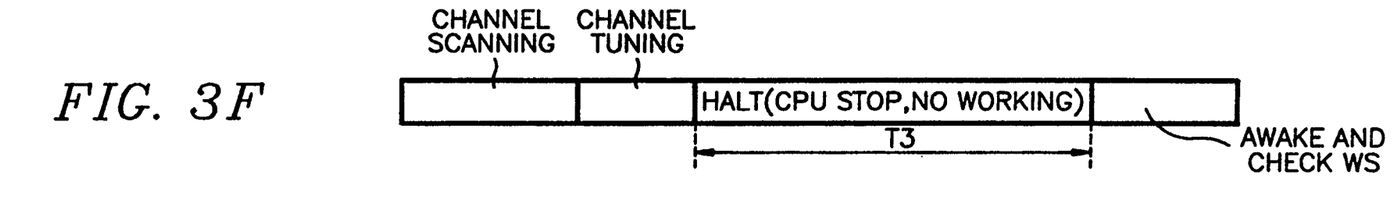
Figure 3G:
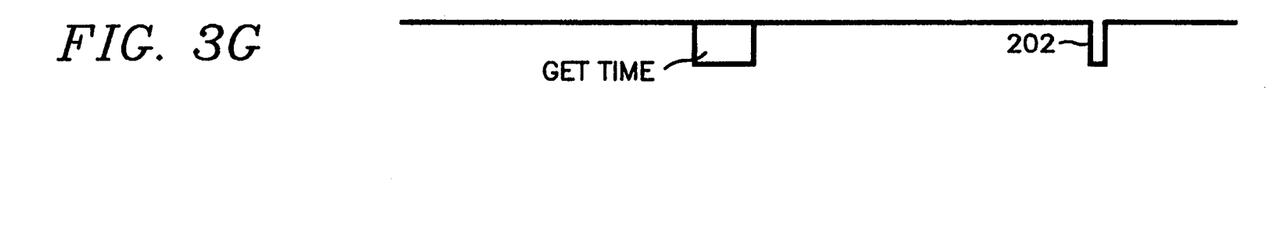

FIGS. 3B–3D are timing diagrams of received data normally processed by the main processor 502 of FIG. 2, wherein FIG. 3B is similar to FIG. 3A, FIG. 3C for the working time T2 and halt time T3 of the main processor 502 according to FIG. 3A, FIG. 3D for the interrupt signals produced by the logic control circuit (504) to work the main processor according to FIG. 3C. FIGS. 3E–3G are timing diagrams of pre-processing of the main processor 502 to find initial data before the normal data processing as shown in FIGS. 3B–3D. FIG. 3E is a waveform of the received data of the data processor 508. FIG. 3F is a sequence for the main processor 502 to detect the word synchronization data. FIG. 3G is to illustrate generation of the interrupt time intervals set up by the main processor 502 into the logic control circuit 504.

Some of the terms used in this application are defined as follows. The "word synchronization data" means 11-bits code (11100010010) transmitted by a local telephone radio station to confirm the precise reception of data. The portable radio telephone must necessarily confirm the 11-bits code before receiving and analyzing data. Confirming two successively received word synchronization data, the portable radio telephone judges it right. However, if the word synchronization data is not confirmed successively at five times, the portable radio telephone judges it wrong. The time taken for the generation of one word synchronization data WS to the generation of the next word synchronization data WS has a period T1 of 46.3 ms as shown in FIG. 3A, so that the portable radio telephone takes minimum 92.6 ms for confirming the word synchronization data.

The "A" or "B" system means one of the two bands divided from a cellular service band. In use, the portable radio telephone selects one of the two bands, from which channel scanning is made for obtaining the network service. The "channel scanning" means that the portable radio telephone selects two of the twenty one channels of a given band with largest RSSIs.

The "halt" of the main processor 502 means that it is stopped in response to an internal command (HALT or SLEEP). It should receive an interrupt signal from an external device to resume the operation. In the present embodiment, the main processor 502 intermittently works employing a programmable timer that makes with a given interval the logic control circuit 504 generate an interrupt signal applied to the main processor to resume the operation. When the main processor 502 is temporarily stopped, the data processor 508 works to receive the data transmitted from the local radio station by an additional data receiving and processing circuit.

The portable cellular radio telephone performs the channel scanning for twenty one of 42 channels to select two channels with largest RSSIs. The main processor 502 tunes the telephone to one of the two channels that receives the data and stands by. Thus the main processor 502 does not consume the battery power during the first and second time intervals.

Figure 4:
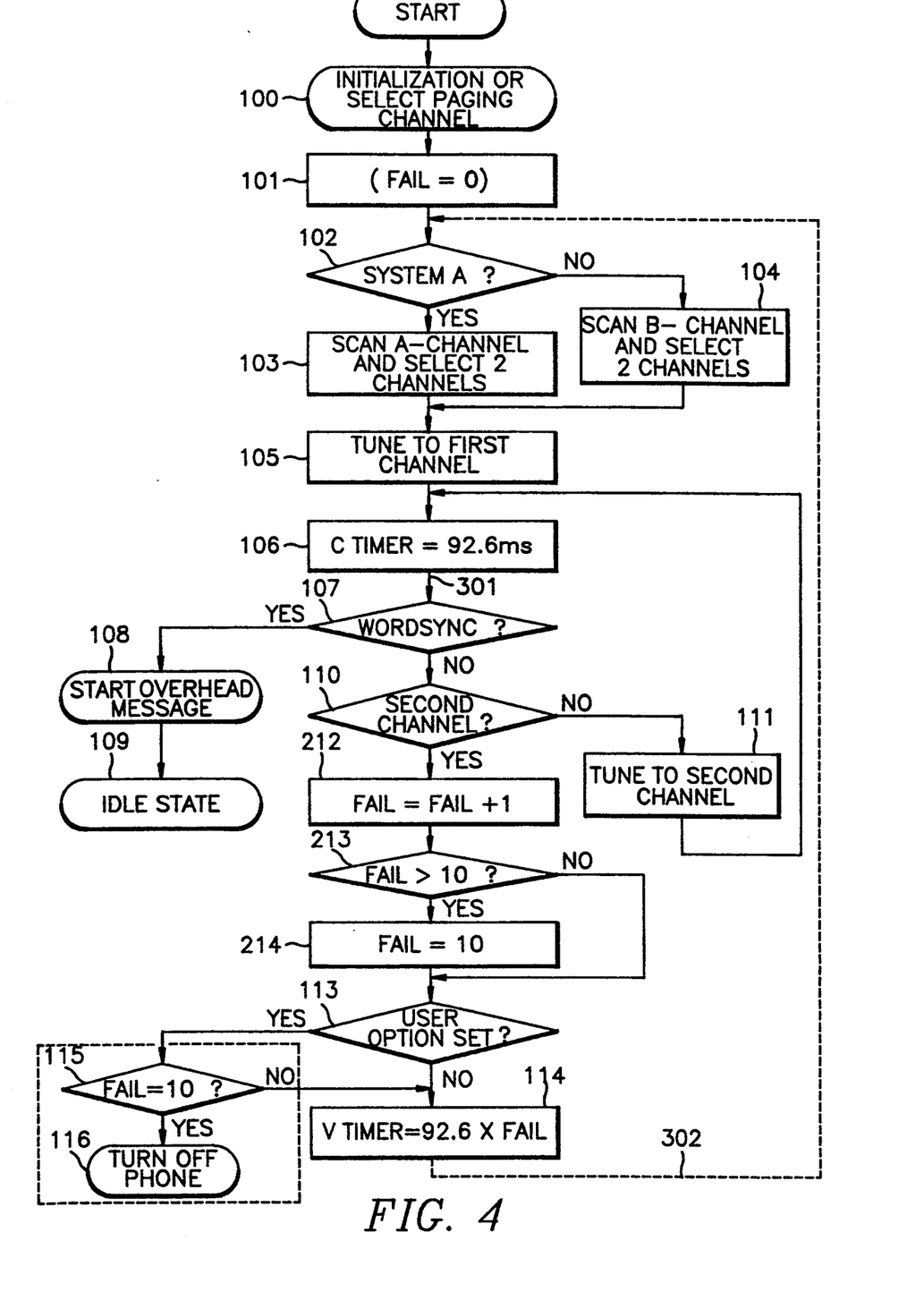
FIG. 4 is a flow chart for the operation of the circuit of FIG. 2.

The main processor 502 starts the operation from step 100 to perform initialization or determine a paging channel. In step 101 a region of the memory 501 is initialized as zero to store the number of fails to detect the word synchronization data. In step 102 the main processor 502 applies a control signal for the channel tuning to the logic control circuit 504. The logic control circuit 504 controls the frequency synthesizer 522 to cause the receiver 520 to receive signals via the duplexer 526. The output of the receiver 520 is received by the receiving audio circuit 506, data processor 508 and logic control circuit 504. The main processor 502 selects the "A" or "B" system according to the output of the data processor 508 in step 102 and applies a control signal to the logic control circuit 504 in steps 103 and 104, so that the logic control circuit 504 controls the frequency synthesizer 522 and receiver 520 to tune to the selected system, thereby receiving the RSSIs from the receiver 502 to select two channels. The main processor 502 controls the portable radio telephone to tune to the first selected channel in step 103.

The main processor 502 sets the timer interrupt port (first time interval 92.6 ms) of the logic control circuit 504 in step 106, then stopped. During the main processor's stopping interval of 92.6 ms the data processor 508 detects via the receiver the word synchronization data, internally storing it as a flag value. After the first time interval the logic control circuit 504 generates an interrupt signal applied to the main processor 502 to resume the operation from the previous stopped position, so that the main processor 502 receives the output of the data processor 508 to detect the word synchronization data in step 107. Detecting the word synchronization data, the main processor 502 performs a program to normally receive the overhead message from the receiving audio circuit 506 in step 108, then taking standby in step 109. However, not detecting the word synchronization data, the main processor 502 checks whether it is the second channel in step 110. If it is not the second channel, the main processor 502 applies a tuning control signal to the logic circuit to control the frequency synthesizer 522 to tune the portable radio telephone to the second channel. After again stopping the main processor 502 during the first time interval in step 106, the data processor 508 is caused to repeat the above steps for detecting the word synchronization data.

Nevertheless, not detecting the word synchronization data from the output of the data processor 508 in both channels in step 107, the main processor 502 increases the number of fails by one in step 212 (FAIL+1). The mode is set so that the number of fails exceeding the boundary value of ten should take the boundary value. The reason is to make the V timer value (92.6×FAIL) be 926 ms at maximum. In step 113 the main processor 502 checks whether the user's option mode is set. The user's option mode means that the battery switch is automatically turned off in the region where the data can not be received. If the user's option mode is not set and the number of fails is ten, the battery switch is automatically turned off in step 116. Or otherwise, the main processor 502 multiplies 92.6 ms by the number of fails to produce the second time interval set into the logic control circuit 504 in step 114. Then the main processor 502 stops the operation during the second time interval. After the second time interval the logic control circuit 504 generates an interrupt signal applied to the main processor 502 to resume the above processing steps from step 102. Thus the portable radio telephone again performs the channel scanning to detect data, continuously repeating the above process.

The stopping of the main processor 502 during the second time interval of IT to 10T (926 ms) before the next channel scanning imparts no disadvantage to the normal function of the portable radio telephone, and therefore the main processor sets the timer interrupt port of the logic control circuit 504 with the second time interval 926 ×FAIL).

Figure 5:
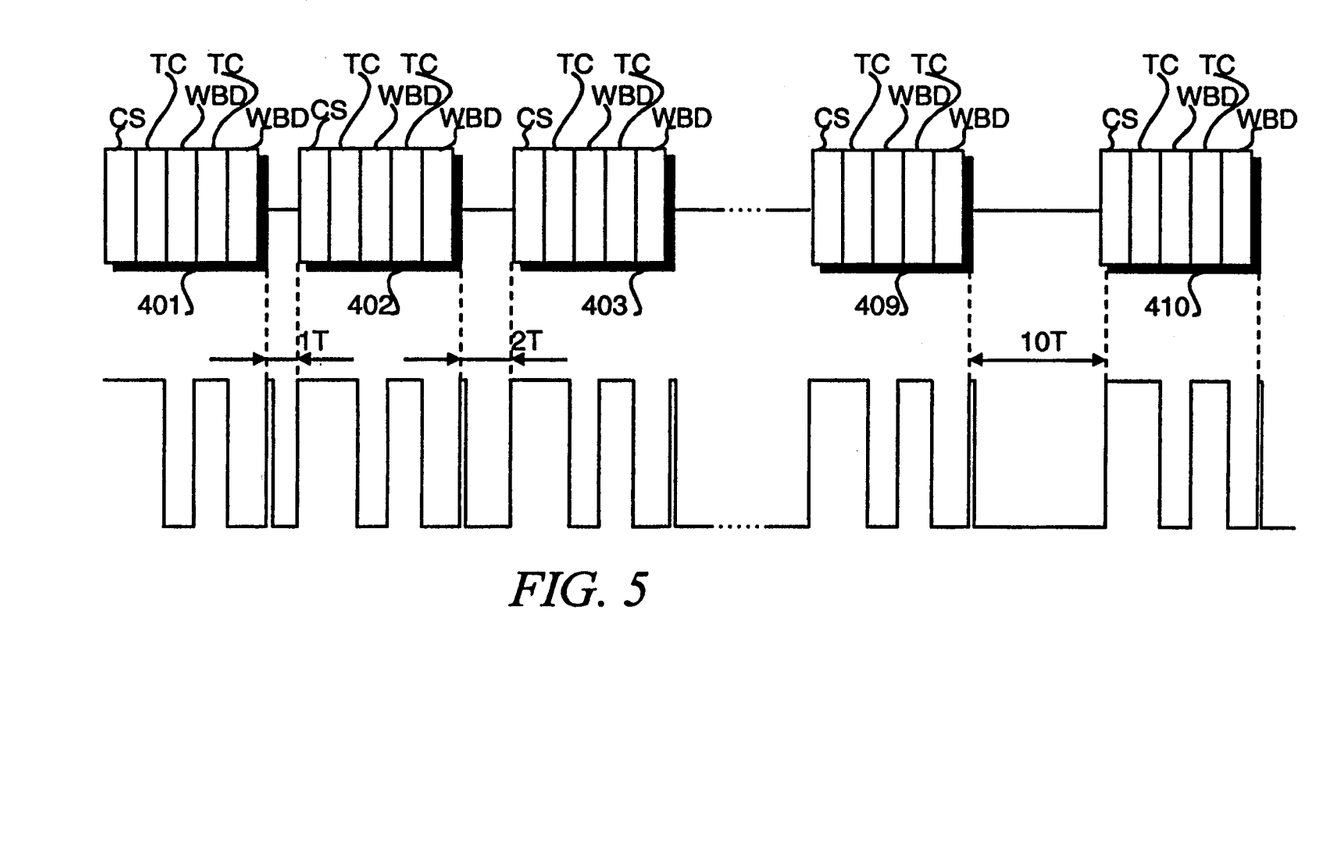
FIG. 5 is a timing diagram for illustrating the sequences of the variable second interrupt time intervals (T−10T) set up into a logic control circuit (504) according to the number of fails before a main processor (502) detects word synchronization data together with wide band data.

After the second interrupt time interval in step 114 as shown in FIG. 5, the logic control circuit 504 generates an interrupt signal applied to the main processor 502 to repeat the processing steps from step 102 to perform the next channel scanning until detecting the word synchronization data in step 107.

As stated above, the main processor stops the operation during the channel scanning to detect the word synchronization data, thus reducing the power consumption. In addition, the battery switch is automatically turned off when the portable radio telephone is in the outside of the network service area.

While the invention has been particularly shown and described with reference to a preferred embodiment, it will be understood by those skilled in the art that modifications in detail may be made without departing from the spirit and scope of the invention.

What is claimed is:

1. A method for saving the power of a battery used in a portable radio telephone, comprising the steps of:
   tuning said portable radio telephone to a first channel to set a first interrupt time interval;
   enabling a signal generator for setting said first interrupt time interval to resume operation after said first interrupt time interval;
   detecting word synchronization data in said first channel;
   tuning said portable radio telephone to a second channel to detect said word synchronization data when said word synchronization data is not detected in said first channel;
   setting a second interrupt time interval in response to a number of fails when said word synchronization data is not detected in said second channel; and
   resuming the operation to detect said word synchronization data after said second interrupt time interval.

2. A method fo saving the power of a battery used in a portable radio telephone in a network, comprising the steps of:
   selecting first and second channels by channel tuning;
   tuning said portable radio telephone to said first channel and setting up a first interrupt time internal during which a main processor is stopped and word synchronization data is detected;
   enabling said main processor to resume normal operation to receive an overhead message when said word synchronization data is detected;
   checking whether said portable radio telephone is tuned to said second channel;
   tuning said portable radio telephone to said second channel when said potable radio telephone is not tuned to said second channel, and performing the first interrupt time interval setting step to detect said word synchronization data in said second channel;
   counting a number of failure to detect said word synchronization data in said second channel when said word synchronization data is not detected and said portable radio telephone is tuned to said second channel;
   checking whether a power-off mode is set for the outside of a service area of the network; and
   setting up a second interrupt time interval to stop operation of said main processor and to perform the above steps for detecting said word synchronization data when said power-off mode is not set or the number of failures is not equal to a given value, and switching off said portable radio telephone when the number of failures equals said given value.

3. The method for saving the power of a battery used in a potable radio telephone as claimed in claim 2, wherein said first interrupt time interval has a given value.

4. The method for saving the power of a battery used in a portable radio telephone as claimed in claim 3, wherein said second interrupt time interval has a variable value obtained by multiplying the given value of said first interrupt time interval by said number of failures.

5. A circuit for saving the power of a battery used in a portable radio telephone is a network, comprising:
   first means for selecting first and second channels by channel tuning;
   second means for tuning said portable radio telephone to said first channel and setting up first interrupt time interval during an interruption of operational performance by a main processor is stopped and word synchronization data is detected;
   third means for enabling said main proccssor to resume said operational performance and to receive an overhead message when said word synchronization data is detected and then revert to said interruption of operational performance;
   fourth means for tuning said portable radio telephone to said second channel when said portable radio telephone is not tuned to said second channel;
   fifth means for performing the first interrupt time setting operation to detect said word synchronization data in said second channel;
   sixth means for counting a number of failures to detect said word synchronization data in said second channel when said word synchronization data is not detected and said portable radio telephone is tuned to said second channel;
   seventh means for checking whether a power-off mode is set for the outside of a service area of the network; and
   eighth means for setting up a second interrupt time interval to stop said main processor and to perform the above steps for detecting said word synchronization data when said power-off mode is not set or the number of failures is not equal to a given value, and switching off said portable radio telephone when the number of failures equals said given value.

6. A method for saving power of a battery utilized in powering a main processor in a portable radio telephone operable to scan two channels in one of two selectable bands divided from a cellular service band, said method comprising the steps of:

setting a value of a fail flag to zero;

selecting one of said two bands and determining which two channels of a plurality of available channels in the selected band are received with the largest signal strength;

tuning to a first one of said two channels;

setting a first time interval for stopping operation of said main processor while simultaneously scanning said first one of said two channels for a word synchronization signal;

generating an interrupt signal after said first time interval to enable said main processor to resume operation for determining whether the word synchronization signal has been received;

tuning to a second one of said two channels if said word synchronization signal was determined not to have been received;

stopping operation of said main processor for a second time interval while simultaneously scanning said second one of said two channels for the word synchronization signal;

generating said interrupt signal after said second time interval to enable said main processor to resume operation for determining whether the word synchronization signal has been received;

increasing said value of said fail flag by a first constant if said word synchronization signal was determined not to have been received in the previous step;

determining whether a user option mode has been set on;

determining whether said value of said fail flag is equal to a second constant; and turning off said portable radio telephone to save said battery power if said value of said fail flag is determined to be equal to said second constant and said user option mode has been set on.

7. The method as claimed in claim 6, further comprising the steps of:

determining, after said step of increasing, whether said value of said fail flag is greater than said second constant; and setting said value of said fail flag to said second constant if it is determined that said value of said fail flag is greater than said second constant and then performing said step of determining whether said user option mode has been set on.

8. The method as claimed in claim 7, further comprising the steps of:

multiplying said first time interval with the value of said fail flag to generate a third time interval if said value of said fail flag is not greater than said second constant;

disabling operation of said main processor during said third time interval; generating said interrupt signal after said third time interval for enabling said main processor to resunit operation; and returning to said step of selecting one of said two bands.

9. The method as claimed in claim 6, further comprising the steps of:

determining, after said step of increasing, whether said value of said fail flag is greater than said second constant;

multiplying said first time interval time the value of said fail flag to generate a third time interval if said value of said fail flag is not greater than said second constant;

disabling operation of said main processor during said third time interval;

generating said interrupt signal after said third time interval for enabling said main processor to resume operation; and returning to said step of selecting one of said two bands.

10. The method as claimed in claim 6, wherein the step of determining whether the word synchronization signal has been received requires reception of two word sync data codes within two successive data periods provided by said first and second time intervals.

11. The method as claimed in claim 10, wherein said word sync data codes are transmitted at 46.3 ms intervals and said first time interval is equal to 92.6 ms.

12. An apparatus for saving power of a battery utilized in powering a portable radio telephone which is operable to scan two channels in one of two selectable bands divided from a cellular service band, said apparatus comprising:

a memory for storing a value of a fail flag and for storing a program for operation of said portable radio telephone;

a main processor for initializing said memory by setting said value of said fail flag to zero, and for generating control signals;

a logic control circuit for controlling a frequency synthesizer to tune a receiver to receive signals from a duplexer;

said receiver for providing output logic control signals to a receiving audio circuit, a data processor and said logic control circuit;

a transmitting audio circuit for receiving a transmitting control signal from said logic control circuit and for providing a signal to a transmitter to be transmitted through said duplexer;

said main processor for processing data from said data processor according to said program stored in said memory for enabling said logic control circuit to control said receiving audio circuit, said transmitting audio circuit, said synthesizer, said transmitter and said receiver;

said main processor being disabled for a first time interval in order to conserve power in said battery while said data processor operates to detect word sync data in an output signal from said receiver; and said logic control circuit generating an interrupt signal for enabling said main processor to resume operation to determine whether said data processor has detected said word sync data.

13. The apparatus set forth in claim 12, wherein said main processor increases said value of said fail flag by one each time it is determined that said data processor has not detected said word sync data and sets a second time interval equal to said first time interval multiplied by said value of said fail flag.

14. The apparatus set forth in claim 13, wherein said main processor ceases to operate for said second time interval to conserve power in said battery, and resumes operation after said second time interval in response to said interrupt signal from said logic control circuit.

15. The apparatus as set forth in claim 14, wherein said second time interval has a maximum time period of ten times said first time interval.

16. The apparatus as set forth in claim 13, wherein said second time interval has a maximum time period of ten times said first time interval.

17. A communication device having a power saving function, comprising:
   means for receiving message signals via an antenna, said message signals comprising word synchronization data and message data;
   means for detecting said word synchronization data from said message signals received via said antenna;
   main processor means for controlling detection of said word synchronization data from said message signals and processing said message data of said message signals, said main processor means being disabled whenever said word synchronization data from said message signals is being detected;
   power control means for controlling operation of said communication device by the steps of:
      tuning said communication device to a first channel from a plurality of channels of a first selected band;
      enabling detection of said word synchronization data of said message signals in said first channel for a first time interval while disabling operation of said main processor means;
      if said word synchronization data of said message signals in said first channel is detected during said first time interval, enabling said main processor means to resume operation to process said message signals;
      tuning said communication device to a second channel from said plurality of channels if said word synchronization data is not detected in said first channel for said first time interval;
      enabling detection of said word synchronization data of said message signals in said second channel for a second time interval while disabling operation of said main processor means;
      if said word synchronization data of said message signals in said second channel is detected during said second time interval, enabling said main processor means to resume operation to process said message signals;
      if said word synchronization data of said message signals in said second channel is not detected during said second time interval, checking whether a power-off mode is set by a user and disabling operation of said main processor means for a third time interval; and
      upon expiration of said third time interval, repeating all of the above steps for a different band.

18. The communication device as claimed in claim 17, wherein said first time interval is 92.6 ms and is substantially identical to said second time interval.

19. The communication device as claimed in claim 17, further comprised of said power control means determining a value of a fail flag, and shutting off power of said communication device when the value of said fail flag reaches a given value, said value of said fail flag incrementing by a constant each time said detecting means fails to detect said word synchronization data from said message signals for each channel.

20. The communication device as claimed in claim 19, wherein said third time interval has a maximum time period of ten times said first time interval and is set by multiplying the value of said fail flag with said first time interval.

* * * * *

UNITED STATES PATENT AND TRADEMARK OFFICE
CERTIFICATE OF CORRECTION

PATENT NO.  : 5,369,798
DATED       : November 29, 1994
INVENTOR(S) : Young-Sub lee It is certified that error appears in the above-indentified patent and that said Letters Patent is hereby corrected as shown below:

| | | |
|---|---|---|
| Column 2 | Line 48, | after "502" insert comma --,--; |
| Column 2 | Line 53, | after "main" insert --processor 502--; |
| Column 3 | Line 17, | after "AMPS" insert comma --,--; |
| Column 3 | Line 18, | before "data" insert comma --,--; |
| Column 5 | Line 3,  | delete "not"; |
| Claim 2  | Column 5, Line 61, change "fo" to --for--; | |
| Claim 2  | Column 6, Line 12, change "failure" to --failures--; | |

UNITED STATES PATENT AND TRADEMARK OFFICE
CERTIFICATE OF CORRECTION

PATENT NO. : 5,369,798

DATED : November 29, 1994

INVENTOR(S) : Young-Sub lee

It is certified that error appears in the above-indentified patent and that said Letters Patent is hereby corrected as shown below:

Claim 5    Column 6, Line 38, change "is" to --in--:

Signed and Sealed this

Twenty-second Day of April, 1997

BRUCE LEHMAN

*Commissioner of Patents and Trademarks*

*Attest:*

*Attesting Officer*